(No Model.) 2 Sheets—Sheet 1.
G. M. PATTEN.
PERMANENT AND TEMPORARY LETTER FILE.
No. 325,625. Patented Sept. 1, 1885.
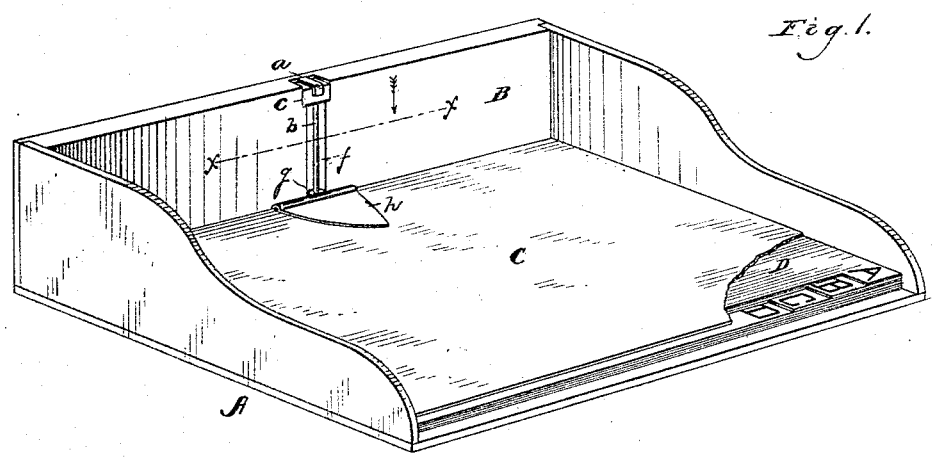
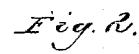
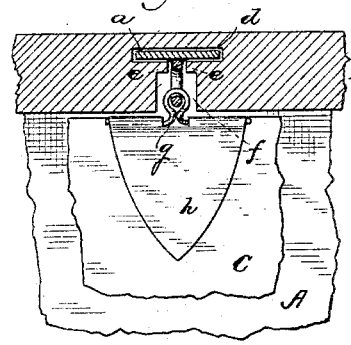
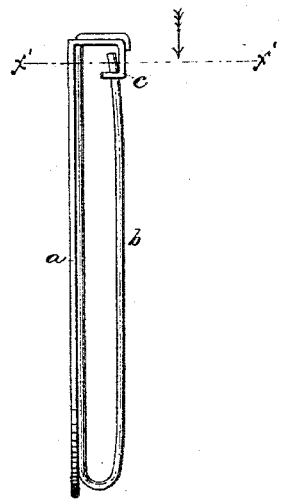
Witnesses.
Inventor.
George M. Patten
per. West & Bond
Attorneys.

(No Model.) 2 Sheets—Sheet 2.
G. M. PATTEN.
PERMANENT AND TEMPORARY LETTER FILE.
No. 325,625. Patented Sept. 1, 1885.
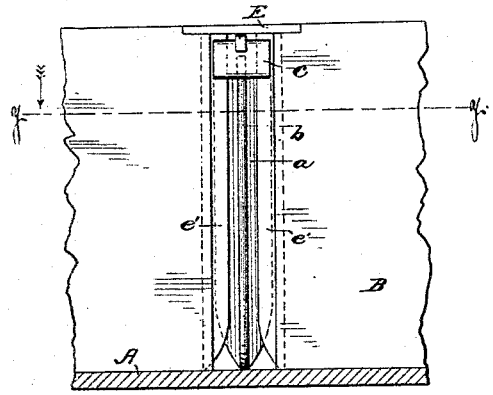
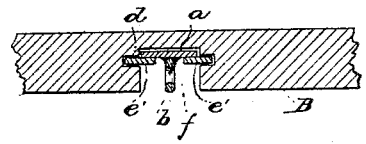
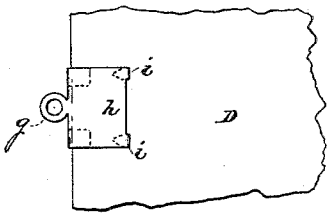
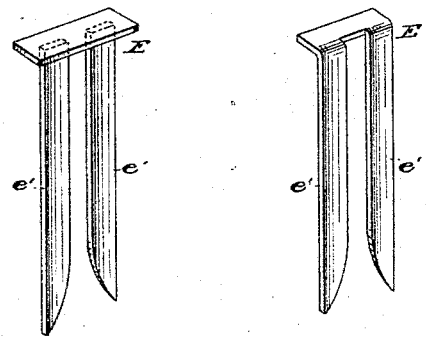
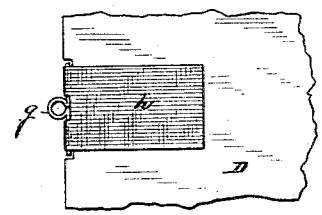
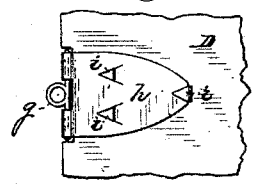
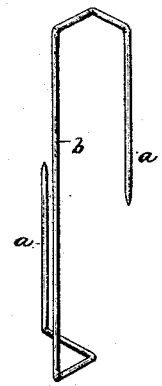
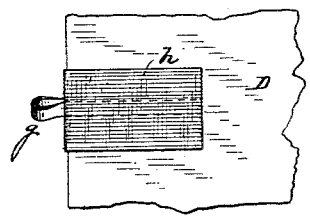
Witnesses.
Henry Frankfurter.
W. S. Baker.
Inventor.
George M. Patten
per. West & Bond
Attorneys.
N. PETERS. Photo-Lithographer. Washington, D. C.

UNITED STATES PATENT OFFICE.

GEORGE M. PATTEN, OF JERSEY CITY, NEW JERSEY, ASSIGNOR TO WILLIAM A. AMBERG, OF CHICAGO, ILLINOIS.

PERMANENT AND TEMPORARY LETTER-FILE.

SPECIFICATION forming part of Letters Patent No. 325,625, dated September 1, 1885.

Application filed March 10, 1884. (No model.)

*To all whom it may concern:*

Be it known that I, GEORGE M. PATTEN, residing at Jersey City, in the county of Hudson and State of New Jersey, and a citizen of the United States, have invented certain new and useful Improvements in Permanent and Temporary Letter-Files, of which the following is a full description, reference being had to the accompanying drawings, in which—

Figure 1 is a perspective view with the index partly completed; Fig. 2, a partial section on line $x\,x$ of Fig. 1; Fig. 3, a front view of the index-holder; Fig. 4, a side view thereof; Fig. 5, a cross-section on line $x'\,x'$ of Fig. 4; Fig. 6, a modification adapting the index-holder for use in a temporary file; Fig. 7, cross-section on line $y\,y$ of Fig. 6; Figs. 8 and 9, perspective views of the removable ledges; Figs. 10, 11, 12, and 13, sections of index-sheets, showing various methods of attaching the loop or eye at their backs, for connecting them with the index-holder; Fig. 14, a perspective view of an index-holder made wholly of wire.

The object of this invention is to provide a file with an improved holder, by means of which the index-sheets, either alone or with their contents, may be readily placed in position or withdrawn without separating the sheets or disturbing the contained matter, and to adapt such device for use in either permanent or temporary files; and its nature consists in the parts and combinations of parts hereinafter described and claimed as new.

In the drawings, A indicates the file; B, its back; C, an index-cover; D, the expansible index-sheets; E $e'$, the removable ledge; $a\,b$, index-holder; $c$, holding-notch for the end of the part $b$; $d$, groove in the back of the file for the part $a$ of the holder; $e$, retaining ledges or projections; $f$, opening in the back for the eyes or other fastenings of the index-sheets; $g$, fastening-eyes; $h$, metal, paper, or cloth fasteners for the eyes $g$, and $i$ points for fastening sheet-metal eyes or tags to the index-sheets.

The box A may be made as shown, or in any other form suitable for use, either as a permanent or temporary file, and its back B is provided with a groove or opening, $d$, as shown in Fig. 2, which is adapted to receive the back plate, $a$, of the holder, and with ledges or projections $e$, which prevent the file-holder from being pulled out. As shown, this opening in the back is also provided with a slot or recess, $f$, for receiving the hinges or eyes at the back of the index-sheets, so as to permit the index-sheets to come flush against the back B. If, however, it is not desired to have the index-sheets come flush with the back, or if it is desired to make the eyes through the body of the index-sheets and the cover when used, then the groove $d$ may be placed farther inward, so as to leave the part or rod $b$ of the holder outside of the back B, in either of which cases the groove $f$ may be omitted, and in this construction the groove will simply consist of the opening or passage $d$ and the ledges or shoulders $e$. When constructed in this form, it will be understood that the holder, with its connected sheets, can only be lifted vertically from the file, which is sufficient in all permanent files. In temporary files, their construction in many cases is such that a top piece or hinges or springs project over or into the box. When a temporary file having such attachments is used, the index-sheets, either by themselves or with their contents, must be withdrawn horizontally, and in order to accomplish this and adapt my holder to use in files of this construction, I make the retaining-ledges of the holder removable, and to do this I construct them as shown in Figs. 8 and 9, and when this device is used the opening in the back B is made without ledges, and with side grooves in the same location, as shown in Fig. 7.

When the removable ledges $e'$ are inserted, the original groove in the back is restored, and the removable ledges $e'$ hold the back plate of the holder $a$ in position, in the same manner as the ledges or shoulders $e$ hold them, and when made in this manner the holder is inserted horizontally and the removable ledges $e'$ inserted from the top. The box is then complete, or ready for use. By withdrawing the ledges the index-sheets, either alone or with their contained matter, can be withdrawn horizontally, or from under any projections which may be attached for other purposes to the back B, or to the sides of the case A.

When the removable ledges are constructed in the form shown at Fig. 8, then the cap-plate which covers the opening gives the file a finished appearance. When made of a single piece of sheet metal and bent as shown in Fig. 9, a small portion of the opening in the back will remain uncovered, the form shown in Fig. 9 being the cheapest form.

The lower end of the back plate, $a$, is rounded more or less to insure its easy insertion, and the removable ledges $e'$ are also rounded more or less at their lower ends for the same purpose. The eyes $g$ for attaching the index-sheets may be made of narrow tape and attached with cloth, as shown in Fig. 12. They may be made of wire and attached with cloth or metal, as shown at Figs. 11 and 13, or they may be made in the body of the sheet metal, as shown at Fig. 10.

The index-sheets are provided with steps or tags containing the letters of the alphabet or of some divisions thereof, of dates or numbers, or of such other indicator of matter to be filed between the sheets as may be desired. The device, as a whole, is designed to be used in the system of open or flat filing by placing the matter between the sheets in its proper space in connection with the proper index-letter or other mark.

The index-holder $a\ b$ is ordinarily made by attaching the wire $b$ to a strip of tin or other sheet metal, $a$, and the wire may be longer than the tin, as shown, and it may be soldered or otherwise attached to it, or the wings may be made of the wire itself. The upper end is preferably made detachable, and when so made is held by the notch $c$, which is most conveniently made by bending over the top of the plate, as shown. The rod may be so bent at the back that the extremities will form wings, and yet permit the eyes or loops of the index-tags to be passed over them into their proper places on the rod, which is sufficient in some cases.

The rod $b$ is made of stiff or spring wire, so that it will spring out when released from the catch and hold itself in place within the catch, and it is not essential that the plate $a$ be made of a continuous strip or piece, as the essential feature is that it have one or more wings to hold it within the recess $d$.

The cheapest and simplest form of using this holder is to apply it at or near the middle of the back B, with a corresponding location of the attaching part of the index; but when properly constructed two or more may be used in the same file-case.

By the use of this device the index-sheets and cover, when used, are readily attached, and are expansible, and when the required extent or scope of a series of index-sheets cannot be predetermined—as is the case with dated, numerical, and other indexes—I can at any time readily add additional leaves to or remove the unused ones from the top by simply withdrawing the holder from its recess sufficiently to disengage the rod $b$, and restore the holder to its former position without danger of disarranging the filed papers.

The same index, with its holder, may be used in either a temporary or permanent file or transfer-case, or be readily transferred from one to the other, without separating the sheets or detaching the holder from them.

The index-sheet holder is used for holding sheets for shipment as well as for use in a case.

What I claim as new, and desire to secure by Letters Patent, is—

1. A detachable index-sheet holder having the flat or wing back $a\ a$ and rod $b$, in combination with a series of expansible index-sheets movable thereon, substantially as described.

2. The combination of the winged detachable holder $a\ b$ with the file-back B, having the groove $d$, and ledges or shoulders $e$, substantially as set forth.

3. The combination of the winged holder $a\ b$ with the case A B, and removable ledges or shoulders, substantially as specified.

4. The holder formed of the flat or wing back $a\ a$, adapted to be inserted in the shouldered groove in the case B, and provided with the wire rod $b$, secured to or forming a part thereof, adapted to be inserted in the eyes or loops $g$ of the index-sheets, substantially as and for the purpose described.

GEORGE M. PATTEN.

Witnesses:
 JNO. H. AMBERG,
 CHAS. S. CHAMBERS.